(12) United States Patent
Schwanemann et al.

(10) Patent No.: US 11,532,962 B2
(45) Date of Patent: Dec. 20, 2022

(54) ELECTRICAL MACHINE WITH COOLING

(71) Applicant: SCHAEFFLER TECHNOLOGIES AG & CO. KG, Herzogenaurach (DE)

(72) Inventors: Peter Schwanemann, Freudenstadt (DE); Matthias Gramann, Renchen (DE); Carsten Angrick, Appenweier (DE); Wolfgang Reik, Bühl (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 459 days.

(21) Appl. No.: 16/610,061

(22) PCT Filed: Apr. 5, 2018

(86) PCT No.: PCT/DE2018/100304
§ 371 (c)(1),
(2) Date: Oct. 31, 2019

(87) PCT Pub. No.: WO2018/202235
PCT Pub. Date: Nov. 8, 2018

(65) Prior Publication Data
US 2022/0094223 A1 Mar. 24, 2022

(30) Foreign Application Priority Data
May 3, 2017 (DE) .......................... 102017109486.5

(51) Int. Cl.
*H02K 1/32* (2006.01)
*H02K 1/20* (2006.01)
(Continued)

(52) U.S. Cl.
CPC ................ *H02K 1/32* (2013.01); *H02K 1/20* (2013.01); *H02K 5/12* (2013.01); *H02K 5/20* (2013.01); *H02K 9/19* (2013.01)

(58) Field of Classification Search
CPC .. H02K 1/32; H02K 1/20; H02K 5/12; H02K 5/20; H02K 9/19; H02K 3/24; H02K 9/00;
(Continued)

(56) References Cited

U.S. PATENT DOCUMENTS 5,570,503 A * 11/1996 Stokes .................... H02K 1/148
29/609
5,592,039 A * 1/1997 Guardiani ................ H02K 9/19
310/227
(Continued)

FOREIGN PATENT DOCUMENTS

| CN | 202872483 U | 4/2013 |
| CN | 104795919 A | 3/2019 |

(Continued)

*Primary Examiner* — Ahmed Elnakib

(57) ABSTRACT

An electrical motor includes a housing, a stator seated in the housing, wherein the stator includes a plurality of stator teeth which extend in the radial direction toward the rotor, a yoke that connects the stator teeth is arranged in such a way that a plurality of first clearances are formed between the housing and the yoke and a plurality of second clearances are formed between the yoke and a free end of the stator teeth, and a coolant guide in contact with at least one axial lateral surface of the yoke, wherein the stator is in interlocking contact with the inner side of the housing.

20 Claims, 2 Drawing Sheets

(51) Int. Cl.
*H02K 5/12* (2006.01)
*H02K 5/20* (2006.01)
*H02K 9/19* (2006.01)

(58) Field of Classification Search
CPC .. H02K 9/08; H02K 9/10; H02K 9/12; H02K 9/14; H02K 9/16; H02K 3/345; H02K 3/34; H02K 1/148
USPC .......................................................... 310/65
See application file for complete search history.

(56) References Cited

U.S. PATENT DOCUMENTS

| | | | | |
|---|---|---|---|---|
| 5,977,679 | A * | 11/1999 | Miller | H02K 17/14 310/216.049 |
| 8,093,769 | B2 * | 1/2012 | Sonohara | H02K 3/24 310/260 |
| 9,780,625 | B2 | 10/2017 | Garrard et al. | |
| 2011/0215660 | A1 * | 9/2011 | Goto | H02K 3/24 310/53 |
| 2011/0221287 | A1 * | 9/2011 | Lucchi | H02K 3/24 310/54 |
| 2014/0091651 | A1 | 4/2014 | Dorfstatter et al. | |
| 2015/0028727 | A1 * | 1/2015 | Watanabe | H02K 11/33 310/60 A |

FOREIGN PATENT DOCUMENTS

| | | | |
|---|---|---|---|
| DE | 3716771 | A1 | 12/1988 |
| DE | 102012020958 | A1 | 4/2014 |
| DE | 102012217711 | A1 | 4/2014 |
| DE | 102013207469 | * | 11/2014 |
| DE | 102013207469 | A1 | 11/2014 |
| DE | 102015100090 | A1 | 7/2015 |
| JP | H 10322942 | * | 12/1998 |
| JP | 2010148230 | A1 | 7/2010 |
| JP | 2011217434 | A | 10/2011 |
| WO | 2016034570 | A1 | 3/2016 |

* cited by examiner

ELECTRICAL MACHINE WITH COOLING

CROSS-REFERENCE TO RELATED APPLICATIONS

This application is the U.S. National Phase of PCT/DE2018/100304 filed Apr. 5, 2018, which claims priority to DE 102017109486.5 filed May 3, 2017, the entire disclosures of which are incorporated by reference herein.

TECHNICAL FIELD

The present disclosure relates to an electrical machine with cooling. In one embodiment, the electrical machine is surrounded by a housing in which a stator is seated, which stator has a large number of stator teeth which extend in the radial direction toward the rotor.

BACKGROUND

German published specification DE 10 2012 217 711 A1 discloses an electrical machine with cooling. The electrical machine comprises a stator, wherein the electrical windings of the stator ring are surrounded by a potting compound. Ducts which are formed close to the electrical windings are provided in the potting compound for cooling purposes.

German published specification DE 10 2015 100 090 A1 discloses cooling of stator coils of an electrical machine. A coolant supply which fills hollow spaces between groups of turns is provided for cooling purposes. The coolant supply has a plurality of fingers, wherein the fingers are arranged between adjacent pairs of coils. The coolant supply has internal passages in order to receive a pressurized coolant and has outlet openings in order to spray coolant onto the coils. In other embodiments, the fingers transport the coolant to all coils with the aid of gravity.

Furthermore, the prior art discloses various methods for cooling (removing heat from) rotating electrical machines. The most common method is indirect cooling of the stator, wherein the heat is dissipated via the housing or via the component which mechanically connects the stator to the housing. The heat is usually passively guided from there, via cooling ridges or via gas or fluid convection, out of the machine. Direct cooling of the machine by an oil bath or an active oil cooling arrangement, which directly taps off the heat from the heat-generating components of the electrical machine, is likewise common. One disadvantage of this variant is the need for an additional oil pump and also a heat exchanger in order to guide the dissipated heat from oil or other media out of the electrical machine (see, for example, German published specification DE 10 2012 020 958 A1).

In the case of the radial flux machine stators known from the prior art, the windings are wound around the teeth of the stator. The yoke of the stator connects the ends of the stator teeth to one another, so that the outer contour of the stator is generally round. Stators with non-round outer contours are also available. However, these are usually designed only for structural reasons, such as anchoring to the housing or the like.

SUMMARY

The object of the present disclosure is to provide an electrical machine which exhibits more efficient cooling (removal of heat) and, in so doing, has a cost-effective and functional design.

According to the disclosure, this object is achieved by an electrical machine described below.

The electrical machine according to one embodiment of the disclosure is surrounded by a housing in which the stator is seated, which stator has a large number of stator teeth which extend in the radial direction toward the rotor. A yoke which connects the stator teeth is arranged in such a way that a plurality of first clearances are formed between the housing and the yoke and a plurality of second clearances are formed between the yoke and a free end of the stator teeth. A coolant guide may be in thermally conductive contact with at least one axial lateral surface of the yoke. In one embodiment, the stator is in interlocking and thermally conductive contact with the inner side of the housing. To this end, the ends of the stator teeth, which ends are situated opposite the free ends of the stator teeth, are anchored on the inner side of the housing (interlocking connection).

According to another embodiment of the disclosure, a coolant guide is fitted on each of the two axial lateral surfaces of the yoke and is likewise in thermally conductive contact with these lateral surfaces.

The coolant guide itself is in the form of a hollow body which has a flat boundary wall and a curved boundary wall. In one embodiment, the flat boundary wall bears against the axial lateral surface or against the axial lateral surfaces of the yoke.

In one embodiment, the yoke is positioned between the housing and the free ends of the stator teeth in such a way that a cross-sectional area of the first clearances and a cross-sectional area of the second clearances are substantially the same size.

In one embodiment, the coils (windings) of the stator are situated in the two clearances which are formed above and below the yoke and also between the stator teeth. The coils can be implemented with any distribution over the yoke known in the prior art. In particular, all possible distributed and concentrated types of winding and also all embodiments, such as round-wire, flat and shaped-wire, bar-type and hairpin windings and also cast windings for example, are possible. The embodiment of concentrated windings, that is to say windings which are each wound around the yoke between the stator teeth, wherein in each case one or in each case a plurality of windings (single-layer, double-layer, triple-layer, . . . ) can be situated between two stator teeth, is particularly advantageous in terms of cost. If these concentrated windings are combined with individual stator teeth, the windings can be prefabricated and fitted onto the yokes only when the stator is assembled from the individual stator teeth. In one embodiment, the separation of the stator teeth can be designed depending on the type of windings. For example, a separation of the yoke on one side directly at the next stator tooth may be advantageous for a single-layer winding, whilst conversely a separation at half the length of the yoke may be more advantageous in the case of a double-layer winding.

As already described above, in the case of the electrical machine, the ends of the stator teeth of the stator, which ends are situated opposite the free ends of the stator teeth, are in interlocking and thermally conductive contact with an inner side of the housing of the electrical machine. By utilizing interlocking connection between the stator (the stator teeth) and the housing or a cooling duct, the ends of the stator teeth engage into corresponding cutouts, so that an interlocking tooth system is produced. According to another embodiment of the disclosure, the assembly or the thermally conductive contact of the stator to the housing or to the cooling duct is also possible without a corresponding tooth system. As a result, the heat can additionally be dissipated via an outer side of the housing and/or at least one cooling duct of the housing.

The stator itself can be constructed from laminated electrical sheets, sintered magnetically permeable material (SMC) or from a solid magnetically permeable material. In one embodiment, the stator can be either manufactured as a whole or manufactured by assembling individual parts (individual stator teeth).

As already mentioned above, it may be advantageous when the windings of the coils are guided between the stator teeth across the yoke and the at least one coolant guide which is in contact with the axial lateral surface of the yoke. The coolant guide, which is fitted on the axial lateral surface of the yoke on one side or on both sides, serves for primary cooling of (removal of heat from) the stator. In order that the windings are in optimal contact with the coolant guide, the coolant guide has formed a boundary wall which is curved on one side. By way of the flat boundary wall, the coolant guide is in contact with the axial lateral surface of the yoke. This design is particularly advantageous since the coolant guide runs between the yoke and the winding heads of the windings. The heat can be directly dissipated from the winding heads. The heat from the stator is likewise received and dissipated via the yoke. Furthermore, potting of the windings in the stator leads to improved heat dissipation from the heat sources to the heat sink (coolant guide or cooling duct or inner side of the housing). Conventional cooling at the outer periphery of the stator can serve as secondary cooling (removal of heat). For example, cooling fins or a cooling duct, which is thermally effectively connected to the stator, such as by potting or thermal contact of the stator with the inner side of the housing for example, are provided here. The stator design is also advantageous here since one half of the winding in the first clearance is situated closer to the cooling duct or to the inner side of the housing.

The advantage of the present disclosure is that the windings are not wound around the stator teeth of the stator, but rather around the yoke of the stator. In addition, the coolant guide is introduced between the yoke and the winding heads, and therefore good thermally conductive coupling between the stator and the winding heads may be achieved. This manner of cooling (removal of heat) via the coolant guide beneath the winding heads is therefore highly effective since it taps off and dissipates the heat directly from the winding. In addition, on account of the arrangement of the windings around the yoke, the coolant guide can be designed as a cost-effective, annular tube with the described shaping.

Therefore, the object of the present disclosure is to provide an electrical machine which exhibits more efficient cooling (removal of heat) and, in so doing, has a cost-effective and functional design.

According to the disclosure, this object is achieved by an electrical machine described below.

BRIEF DESCRIPTION OF THE DRAWINGS

Exemplary embodiments will illustrate the disclosure and the advantages thereof in more detail below with reference to the appended figures. The proportions in the figures do not always correspond to the real proportions since some forms are simplified and other forms are illustrated on a larger scale than other elements for the purpose of better illustration. In the figures.

Identical reference symbols are used for identical or identically acting elements of the disclosure. Furthermore, for reasons of clarity, only reference symbols which are required for describing the respective figure are illustrated in the individual figures.

DETAILED DESCRIPTION

Figure 1:
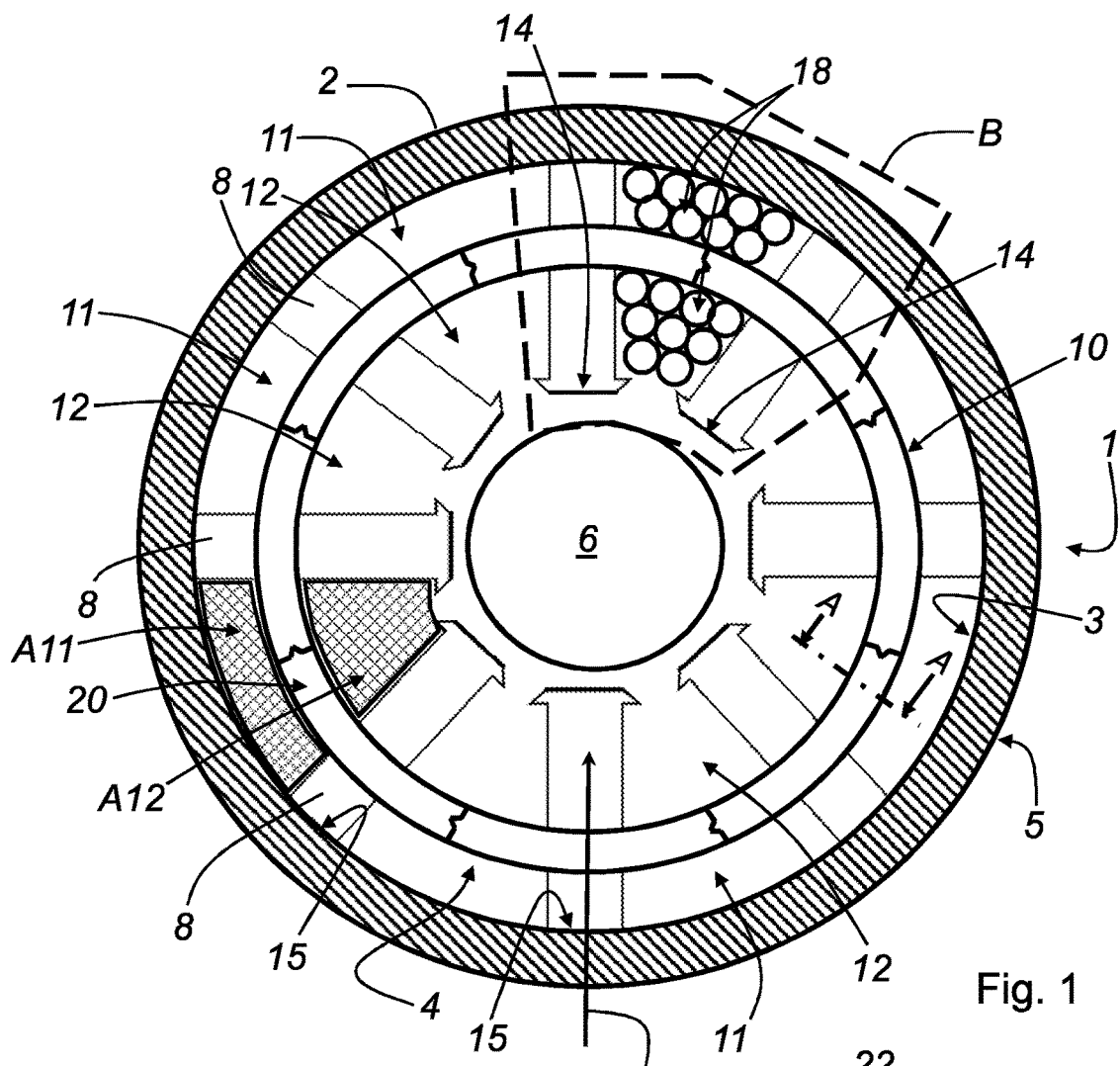
FIG. 1 shows a cross-sectional view of an electrical machine according to one possible embodiment of the present disclosure.

FIG. 1 shows a schematic sectional view through an electrical machine 1 according to one possible embodiment of the disclosure. The electrical machine 1 consists of a housing 2 in which a stator 4 and a rotor 6 are accommodated. In one embodiment, the stator 4 is arranged in the housing 2 in such a way that it is in thermally conductive contact with an inner side 3 of the housing 2. The stator 4 is constructed from a large number of stator teeth 8 which are connected to one another by a yoke 10. In one embodiment, the stator teeth 8 are arranged in such a way that their free ends 14 are directed toward a central rotor 6. In one embodiment, all of the stator teeth 8 are oriented in a radial direction R toward the rotor 6. According to the disclosure, the yoke 10 is arranged in such a way that the yoke 10 is at a distance from the inner side 3 of the housing 2. This arrangement according to the disclosure of the yoke 10 therefore produces a first clearance 11 which is formed between the inner side 3 of the housing 2 and the yoke 10. Similarly, a second clearance 12, which is formed between the yoke 10 and the free ends 14 of the stator teeth 8, results from the arrangement according to the disclosure of the yoke 10.

The windings 18 for the stator coils are arranged in the first clearance 11 and the second clearance 12. The arrangement of the yoke 10 in relation to the inner side 3 of the housing 2 or to the free end 14 of the stator teeth 8 is advantageously selected in such a way that a cross-sectional area A11 of the first clearance 11 and a cross-sectional area A12 of the second clearance 12 have substantially the same area. Owing to this manner of arrangement of the yoke 10, the same number of windings 18 can therefore be guided in the first clearance 11 and in the second clearance 12.

Figure 2:
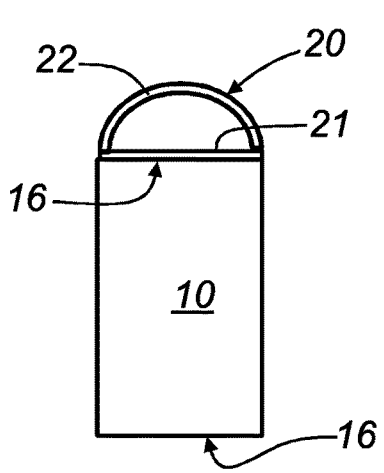
FIG. 2 shows an embodiment of the yoke with the coolant guide along the section line A-A shown in FIG. 1.

FIG. 2 shows a schematic sectional view of the yoke 10 along the section line A-A shown in FIG. 1. In the embodiment illustrated here, a coolant guide 20 is in thermally conductive contact with an axial lateral surface 16 of the yoke 10. In one embodiment, the coolant guide 20 is formed in such a way that it has a flat boundary wall 21 and a curved boundary wall 22. It is obvious to a person skilled in the art that the manner of the curvature of the curved boundary wall 22 can be configured in line with the requirements for the manner of the winding of the windings 18 around the yoke 10. The embodiments, illustrated in FIGS. 2 and 3, of the curved boundary wall 22 should in no way be interpreted as limiting the disclosure. In one embodiment, the flat boundary wall 21 bears against the axial lateral surface 16 of the yoke 10. As a result, good thermal contact between the yoke 10 and the coolant duct 20 is provided in order to ensure effective dissipation of heat from the stator 4.

Figure 3:
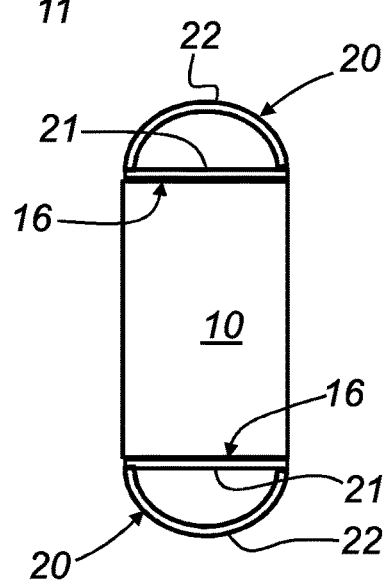
FIG. 3 shows a further embodiment of the yoke with the coolant guides according to the section line A-A shown in FIG. 1.

FIG. 3 shows a further embodiment of the arrangement of the coolant guide 20 on the yoke 10 of the stator 4. Two coolant guides 20 are provided in the embodiment illustrated here. In one embodiment, one of the coolant guides 20 is fitted on each axial lateral surface 16 of the yoke 10.

Figure 4:
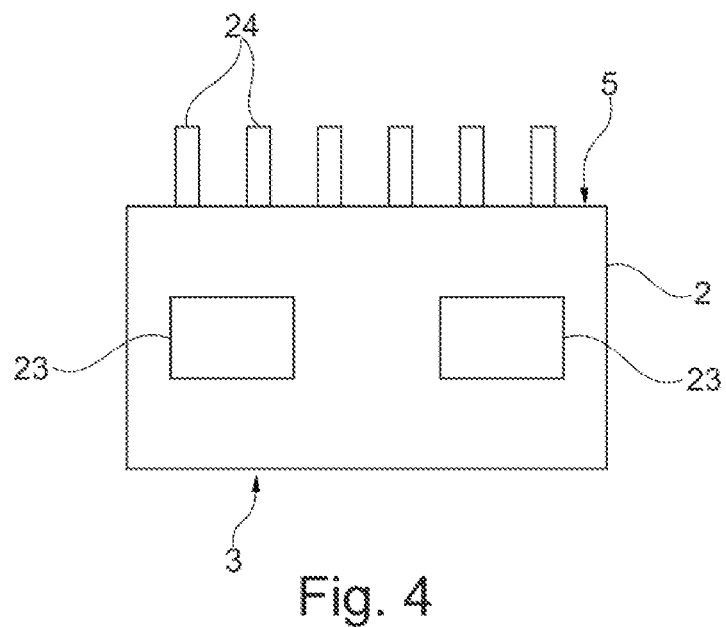
FIG. 4 shows a schematic sectional view of the housing in which the stator is inserted.

FIG. 4 shows a schematic cross-sectional view of the housing 2 of the electrical machine 1. As shown in the illustration of FIG. 1, the ends 15 of the stator teeth 8, which ends are situated opposite the free ends 14 of the stator teeth, are in thermally conductive contact with the inner side 3 of the housing 2. Therefore, secondary cooling (removal of heat) can be rendered possible via the housing 2. To this end, at least one cooling duct 23 can be formed in the housing 2 itself. Similarly, it is possible for the cooling duct 23 to be provided directly on the inner side 3 of the housing 2 and therefore for the ends 15 of the stator teeth 8 to be; in direct thermally conductive contact with the corresponding cooling duct 23. In addition to the cooling duct 23, a plurality of cooling fins 24 can be provided on the outer side 5 of the housing 2, which cooling fins therefore assist the transportation of heat away from the housing 2.

Figure 5:
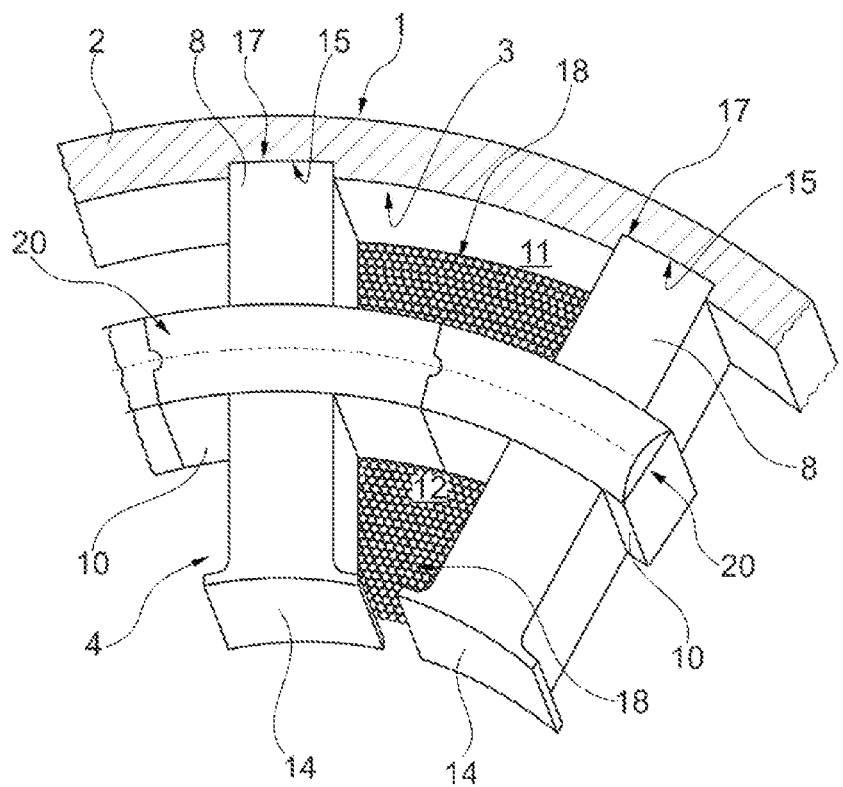
FIG. 5 shows a perspective partial view of the region identified by B in FIG. 1.

FIG. 5 shows a perspective partial view of the electrical machine 1 according to the region identified by B in FIG. 1. As already mentioned in the description relating to FIG. 1, the yoke 10 is arranged in such a way that it is at a distance from the inner side 3 of the housing 2. In one embodiment, the yoke 10 is arranged in such a way that a first clearance 11 is formed between the inner side 3 of the housing 2 and the yoke 10 and a second clearance 12 is formed between the yoke 10 and the free ends 14 of the stator teeth 8. The windings 18 for the coils are provided in the first clearance 11 and the second clearance 12.

In the embodiment illustrated here, the stator 4 is connected in an interlocking manner to the housing 2 in such a way that the ends 15 of the stator teeth 8, which ends are situated opposite the free ends 14, engage into a corresponding cutout 17 on the inner side 3 of the housing 2. Fixed seating of the stator 4 in the housing 2 can be ensured owing to this tooth system. It is obvious to a person skilled in the art that a different way of fastening the stator 4 in the housing 2 is also possible. Therefore, the embodiment, illustrated here, of the fastening of the stator 4 should not be interpreted as limiting the disclosure. The coolant duct 20 is mounted on the yoke 10 and is in thermally conductive contact with said yoke, as has already been adequately described in FIGS. 2 and 3. In the embodiment illustrated here, the yoke 10 is of multipartite form and can be assembled with the stator teeth 8 to form the finished ready-to-mount stator 4.

LIST OF REFERENCE SYMBOLS

1 Electrical machine
2 Housing
3 Inner side
4 Stator
5 Outer side
6 Rotor
8 Stator teeth
10 Yoke
11 First clearances
12 Second clearances
14 Free end
15 End
16 Axial lateral surface
17 Cutout
18 Winding
20 Coolant guide
21 Flat boundary wall
22 Curved boundary wall
23 Cooling duct
24 Cooling fins
A11 Cross-sectional area
A12 Cross-sectional area
A-A Section line
B Region
R Radial direction

The invention claimed is:

1. An electrical machine comprising:
a stator surrounded by a housing, wherein the stator includes a plurality of stator teeth that extend in a radial direction toward a rotor;
a yoke which connects the stator teeth to include a plurality of first clearances formed between the housing and the yoke and a plurality of second clearances are formed between the yoke and a free end of the stator teeth; and
a coolant guide in thermally conductive contact with at least one axial lateral surface of the yoke, wherein the coolant guide is arranged to extend in a circumferential direction between the first clearances and the second clearances.

2. The electrical machine of claim 1, wherein two axial lateral surfaces of the yoke and the coolant guide are in thermally conductive contact with the respective lateral surfaces of the yoke.

3. The electrical machine of claim 2, wherein the coolant guide is formed as a hollow body with a flat boundary wall and a curved boundary wall that bears against the axial lateral surface of the yoke.

4. The electrical machine of claim 1, wherein the yoke is positioned between the housing and the free ends of the stator teeth in such a way that a cross-sectional area of the first clearances and a cross-sectional area of the second clearances are substantially the same size.

5. The electrical machine of claim 1, wherein ends of the stator teeth of the stator, wherein the ends are situated opposite the free ends of the stator teeth, are in interlocking and thermally conductive contact with an inner side of the housing and configured to allow heat to dissipate via an outer side of the housing or at least one cooling duct of the housing.

6. The electrical machine of claim 1, wherein the stator is constructed from laminated electrical sheets, a sintered, magnetically permeable material, or a solid conductive material.

7. The electrical machine of claim 6, wherein the stator is manufactured as a whole or from parts.

8. The electrical machine of claim 1, wherein windings for coils of the stator are provided in the first clearances and the second clearances between the stator teeth.

9. The electrical machine of claim 8, wherein the coils comprise a plurality of windings which are guided between two stator teeth across the yoke and the coolant guide.

10. The electrical machine of claim 8, wherein the coils are potted in the first clearances and the second clearances.

11. An electrical machine, comprising:
a stator surrounded by a housing, wherein the stator includes a plurality of stator teeth that extend in a radial direction toward a rotor;
a yoke configured to connect the stator teeth in a circumferential direction, wherein the stator teeth include a plurality of first clearances formed between the housing and the yoke and a plurality of second clearances formed between the yoke and a free end of the stator teeth; and a coolant guide in contact with at least one axial lateral surface of the yoke, wherein the coolant guide is arranged on the yoke such that the coolant guide extends in the circumferential direction between the first clearances and the second clearances.

12. The electrical machine of claim 11, wherein the coolant guide is in thermally conductive contact with the axial lateral surface.

13. The electrical machine of claim 11, wherein coolant guide is fitted on two axial lateral surfaces of the yoke and is in thermally conductive contact with these lateral surfaces.

14. The electrical machine of claim 11, wherein a plurality of windings are wrapped around the yoke.

15. The electrical machine of claim 11, wherein the yoke is positioned between the housing and free ends of the stator teeth.

16. An electrical motor, comprising:
a housing;
a stator seated in the housing, wherein the stator includes a plurality of stator teeth which extend in a radial direction toward a rotor;
a yoke that connects the stator teeth is arranged in such a way that a plurality of first clearances are formed between the housing and the yoke and a plurality of second clearances are formed between the yoke and a free end of the stator teeth; and
a coolant guide in contact with at least one axial lateral surface of the yoke, wherein the stator is in interlocking contact with inner side of the housing, wherein the coolant guide is arranged on the yoke such that the coolant guide extends in a circumferential direction between the first clearances and the second clearances.

17. The electrical motor of claim 16, wherein the coolant guide is in thermally conductive contact with at least one axial lateral surface of the yoke.

18. The electrical motor of claim 16, wherein the coolant guide includes a hollow body with a flat boundary wall and a curved boundary wall, wherein the flat boundary wall bears against the axial lateral surface of the yoke.

19. The electrical motor of claim 16, wherein the yoke is positioned between the housing and free ends of the stator teeth.

20. The electrical motor of claim 16, wherein a plurality of windings of the stator are situated in one or more clearances which are formed above or below the yoke.

* * * * *